May 21, 1940.  E. GRETENER  2,201,487
ARRANGEMENT FOR AVOIDING COLORED FRINGES WHEN
TAKING IMAGES ON LENTICULATED FILMS
Filed March 18, 1936  2 Sheets-Sheet 1
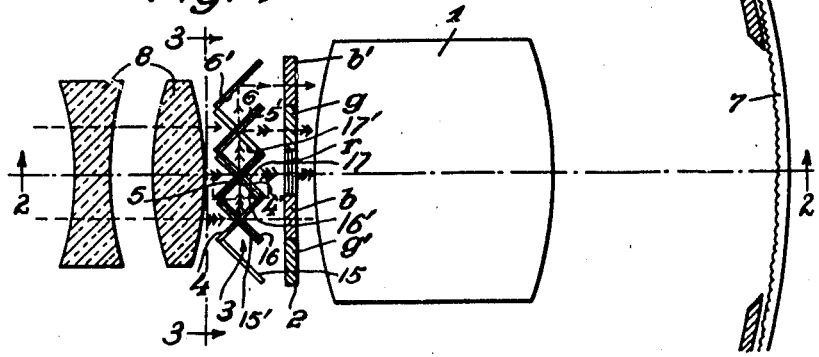
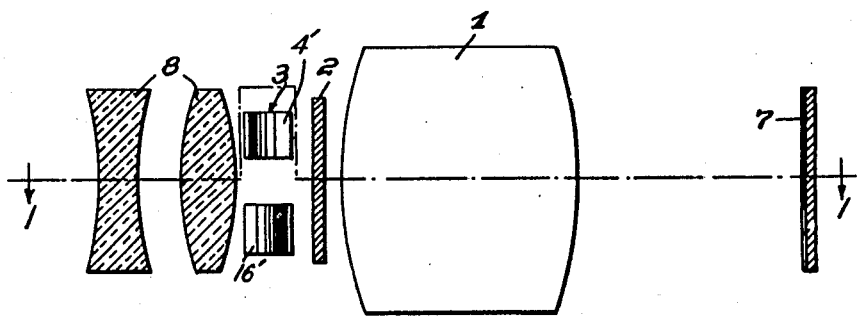
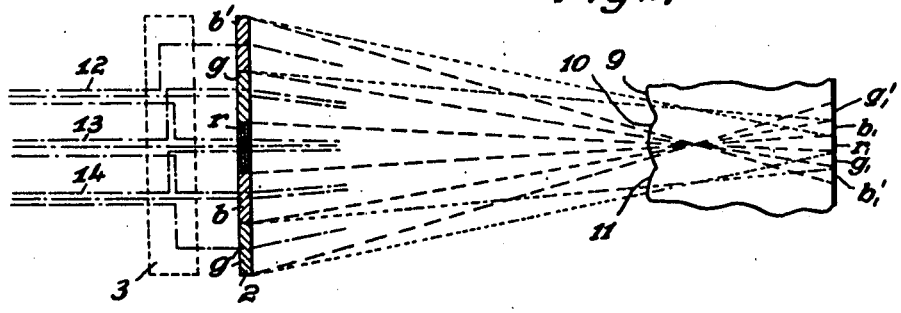
Edgar Gretener
INVENTOR.
By Gifford, Scull & Burgess
ATTORNEYS.

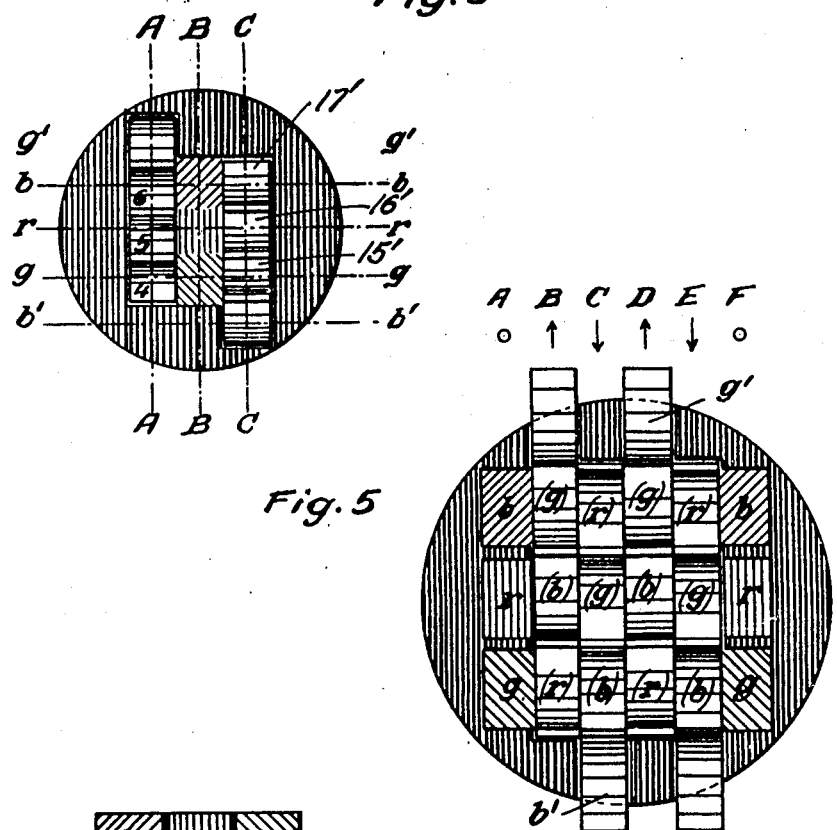
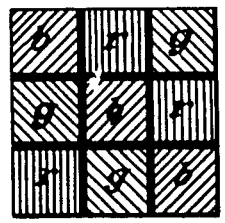

Patented May 21, 1940

2,201,487

UNITED STATES PATENT OFFICE 2,201,487

ARRANGEMENT FOR AVOIDING COLORED FRINGES WHEN TAKING IMAGES ON LENTICULATED FILMS

Edgar Gretener, Berlin-Siemensstadt, Germany, assignor, by mesne assignments, to Kislyn Corporation, New York, N. Y., a corporation of Delaware Application March 18, 1936, Serial No. 69,449
In Germany March 19, 1935

7 Claims. (Cl. 95—2)

My invention relates to an arrangement for avoiding colored fringes when taking images on lenticulated films.

When taking images on lenticulated films the objects lying too far outside the plane of sharpness present colored fringes. This occurs particularly in the case of objectives of large relative aperture.

Various methods have already been proposed for avoiding such colored fringes. In the majority of cases the methods have, however, the disadvantage that they can be only employed if the objects to be photographed are illuminated very intensely, whereas in the case of dark scenes the color film objectives of large relative aperture hitherto known, which bring about colored fringes, must be employed.

The invention relates to an arrangement which is substantially designed to avoid the formation of colored fringes when taking pictures on films having spherical lenticular elements. By the use of an auxiliary arrangement it is, however, possible to avoid by substantially the same means also the formation of colored fringes when employing films with cylindrical lenticular elements. In this case the novel arrangements have the advantage that the luminous intensity is just as great or somewhat smaller than that of the apparatus for photographing images hitherto employed which afford no protection against the formation of colored fringes.

In the arrangement according to the invention, when used with spherical lenticulations, the multi-zone colored filter is split up into juxtaposed zones of different color in two directions perpendicular to each other. In each direction, parallel to the sides of the rectangle formed by this arrangement, the zones of different color are placed in juxtaposition. Consequently, if, for instance, the colored filter consists of nine zones which are arranged in three lines each having three zones the sequence of colors is permutated in the lines when passing from one line to the other. In the first line the sequence is, for instance red—green—blue, in the second line blue—red—green and in the third line green—blue—red. The color filter may, however, consist of more than nine zones. For instance, 18 zones may be arranged in six lines each having three zones. Also in this case it is preferable to permutate the colors when passing from one line to the other. However, in this case another sequence of colors may be of advantage as hereinafter described by way of an example.

Fig. 1 is a diagrammatic view of one arrangement which may be used in practicing the invention, this view being taken approximately on the line 1—1 of Fig. 2;

Fig. 2 is a view taken approximately on the line 2—2 of Fig. 1;

Fig. 3 is a view taken approximately on the line 3—3 of Fig. 1;

Fig. 4 is a diagrammatic view on a greatly enlarged scale illustrating the paths of the various rays;

Fig. 5 is a view similar to Fig. 3 but showing the invention as used with a different number of mirrors;

Fig. 6 is a face view of a form of filter which may be used with spherical lenticulations or, under certain conditions, with cylindrical lenticulations.

If the filter shown in Fig. 6 is employed in a manner well known in the art in connection with an objective for photographing images and if a lenticulated film with spherical lenticular elements is used no colored fringes will appear even at the borders of well-defined objects which lie for a considerable distance outside the plane of sharpness, the images taken having simply an unsharpness as in the case of ordinary black and white films and which cannot be at all avoided as long as objectives of large aperture are employed. The most favorable arrangement of the colored filters is such that the sides of the rectangle extend horizontally or vertically. In this case no colored fringes appear at all. Only minute colored fringes may appear along diagonal borders which, however, are very seldom. They are, however, considerably weaker than in the case of the usual apparatus for photographing images and are by no means annoying.

When taking pictures on films with cylindrical lenticular elements a system of plain reflecting surfaces must be arranged in front of the colored filter, i. e., in the beam of light coming from the object and directed to the colored filter. The colored filter just referred to consists as has hitherto been the case of stripe-like zones of different color placed in juxtaposition. The plain mirrors are arranged in front of the filter in such a manner that the zones of the filters appear partially changed that is to say partially permutated when viewed from the object. If, for instance, a film which has a lenticulation perpendicular to the axis of the film is used so that also the stripe forming the multi-colored filter extends in the same direction, the mirrors are arranged in such a manner that the colors red, blue, green appear juxtaposed in the upper stripe of the objective aperture and green, red, blue in the central stripe lying thereunder and blue, green, red in the lower stripe. In this manner it is possible by the use of films having cylindrical lenticular elements to obtain images free of colored fringes as is the case with the above-described arrangement for films with spherical lenticular elements.

Arrangements for producing images free of colored fringes on films with cylindrical lenticular elements are shown in Figs. 1 to 5. Fig. 1 shows a horizontal and Fig. 2 a vertical cross-section of an objective with a colored filter and a body consisting of plain reflecting surfaces for avoiding colored fringes. The colored filter 2 is placed in front of the objective 1 and consists of five zones $b'$, $g$, $r$, $b$, $g'$. In front of the colored filter is arranged the device 3 consisting of a plurality of plain reflecting surfaces which are arranged as shown in Fig. 3 representing a front view of the filter and the mirrors placed in front thereof viewed from the side of the object.

The rectangular objective aperture which is taken up by the colored filter consisting of five zones is subdivided into three stripes A, B, C of equal width and extending in the vertical direction, transversely of the lenticulations. Before the left-hand stripe A there are three mirrors 4, 5 and 6. A second set of mirrors 4', 5' and 6' respectively extends in parallel relation to the set of mirrors 4, 5 and 6 so that all rays of light coming from the object and falling on any of the mirrors 4, 5 or 6 are deviated but remain parallel to their original direction before reaching the colored filter. Preferably, pairs of mirrors are used as shown, these mirrors being parallel to each other and being disposed at 45° to the plane of the filter 2, as shown. The device 3 is also shown as comprising two sets of mirrors spaced apart and parallel to each other, but both extending across or laterally of the zones of the filter. One of these sets consists of the pairs of mirrors 4—4', 5—5', and 6—6', as previously described, and the other set shown consists of the pairs of mirrors 15—15', 16—16', and 17—17'.

In the arrangement shown in Figs. 1 and 2 the lenticulated film 7 on which the pictures are taken is arranged behind the objective 1 at a distance equal to the focal length of the objective. The film guide, the objective with the colored filter and the mirrors are firmly adjusted with respect to one another. In order to effect a sharp adjustment when taking pictures of objects which do not lie at infinity a further optical system 8 which may preferably consist of a positive and negative lens forming a collimating system and which is so adjusted in a manner well known in the art as to obtain sharp pictures is arranged in front of the mirrors.

With the above arrangement, it will be seen that the collimating lens system 8, which has a diameter at least as great as the width of the group of color zones $g$, $r$, and $b$ of the filter, will direct a beam of light, from the object being photographed, in parallel rays towards all the zones of that group, these zones, as well known in the art, being colored with the primary colors, whose sum gives substantially the effect of white light. Part of this beam, that part which passes through the free space between the two sets of mirrors represented at B in Fig. 3, passes directly through the filter without deviation, and from Fig. 3 it will be seen that some of this part of the beam will pass through each one of the zones in the aforesaid group.

On the other hand, the two sets of mirrors will intercept other parts of the beam, on opposite sides of the free space, and divert the light in those parts into paths which are parallel to their original paths or parallel to the axis of the beam, but which are offset laterally of the zones of the filter, preferably to the extent of one zone. One set of mirrors will offset or divert a part of the beam laterally in one direction, while the other set will divert a part in the opposite direction, as best shown in Fig. 4, which will now be described.

Fig. 4 shows in a diagrammatic form only the colored filter 2 which as in the case of Fig. 1 consists of five zones and a highly magnified portion of the lenticulated film of which particularly the three lenticular elements 9, 10, 11 are considered. The three filter zones $b$, $r$ and $g$ are so dimensioned that the lenticular element 10 projects the images $b_1$, $r_1$, $g_1$ of these zones, the images taken together having the width of the lenticular element. The images $b_1'$, $g_1'$ of the filter zones $b'$ and $g'$ projected by the lenticular element 10 lie behind the lenticular elements 9 and 11 where the lenticular elements 9 and 11 project the zones $g$ and $b$. Conversely, the lenticular elements 9 and 11 project pictures of the zones $b'$ and $g'$, the pictures coinciding with the pictures $b_1$ and $g_1$ projected by the lenticular element 10.

If the path of the rays through the body placed in front of the colored filter and consisting of reflecting surfaces is followed it will be seen that the light passing through the zone $r$ is composed of three partial beams coming from the beams of light 12, 13 and 14. In the same manner the light passing through the zones $g$ and $g'$ consists of three partial beams also originating from the three beams of light 12, 13 and 14. Finally also the same applies to the zones $b$ and $b'$. The main point is that the three beams of light 12, 13, 14 differing stereoscopically from one another are split up in such a manner that each partial beam passes through a differently colored filter.

It will be seen that the objective aperture is not completely utilized in the arrangement according to Figs. 1 to 3. The arrangement may be, however, considerably improved if the objective aperture is subdivided into more than three; for instance into six vertical stripes as is shown in Fig. 5. The arrangement of the objective, filter, reflecting surfaces, etc., is the same as shown in Figs. 1 to 3, except that in this case the objective aperture is subdivided into six vertical stripes A—F. The three zones $b$, $r$ and $g$ of the colored filter are seen directly in the stripes A and F lying externally of the other stripes when viewed from the object. In front of the zones B—E reflecting surfaces are arranged in exactly the same manner as in the case of the above-described arrangements, which surfaces effect alternately a parallel deviation of the rays in the upward and downward direction. The letters $b$, $r$ and $g$ in parentheses (Fig. 5) indicate which color is seen at the different points when viewing the arrangement consisting of plain reflecting surfaces from the object. It will be seen that the colors blue, green and red alternate regularly in each horizontal stripe so that colored fringes cannot appear. On the other hand, it will be seen that when the rays are deviated in the upward or downward direction not the entire light passes through the round objective aperture, but the rays of light not passing therethrough or striking the objective mount form, however, only such a small portion of the total light as not to cause a formation of colored fringes. The single zones of the filters shown in Figs. 5 and 6 may also have a round or a partially round shape without changing their mutual arrangement.

In the arrangements shown in Figs. 1 to 5 the beam of light coming from the object is split up by the plain reflecting surfaces into stripes which run perpendicularly to the zones of the colored filter. The reflecting surfaces then cause the rays of light of the different stripes in the space in which the object is found directed to the same zone to be partially deviated so that they pass through filter zones of different color. The mirror system and the filter may, however, be also substituted one for the other or transposed. The filter is then composed of zones of different colors in the manner as viewed from the object in the arrangement according to Fig. 6 and the reflecting surfaces cause the rays of light of the same color in the different bands to be laterally deviated into the same band so that the usual colored filter consisting of bands may be viewed from the film. In this case the focussing system employed for the adjustment must have a greater aperture than in Fig. 1, whereas the aperture of the objective is smaller.

I claim as my invention:

1. In an apparatus for taking pictures, a lenticulated film adapted to carry a group of color records of an image behind each lenticulation thereof, an objective adapted to cooperate with said lenticulations to form said records, a collimating lens in front of said objective and spaced therefrom, and a color filter and reflectors disposed between said lens and objective, said filter having a plurality of zones arranged in checkerboard squares of lateral sequence of recurrent groups, the sum of the colors of each group giving substantially the effect of white light while each such successive sequence vertically adjacent is recedent one square in relation to the contiguous sequence above said filter, being placed adjacent to the collimating lens and said plane reflectors being adjacent to the objective and deflecting the light passing through said lens and filter to appear at the emulsion behind each lenticulation as a normal striped zoned color filter with stripes parallel to the lenticulation.

2. In an apparatus for taking color pictures upon a lenticulated film, a plural-zoned color filter in front of said film and comprising a group of adjacent zones the sum of whose colors gives substantially the effect of white light, a collimating lens system in front of said filter and having a diameter at least as great as the width of said group, whereby it may direct a beam of light in parallel rays towards all of the zones of said group, and an optical device disposed between said lens system and said filter, said device having a free space through which part of said beam may pass substantially undeviated to all of the zones of said group and also having a set of reflectors comprising pairs of parallel reflecting surfaces at 45° to the plane of the filter and arranged to intercept another part of said beam and to divert it through paths parallel to the axis of said beam but offset laterally of said zones with respect to the original paths of the intercepted light.

3. In an apparatus for taking color pictures upon a lenticulated film, a plural-zoned color filter in front of said film and comprising a group of adjacent zones the sum of whose colors gives substantially the effect of white light, a collimating lens system in front of said filter and having a diameter at least as great as the width of said group, whereby it may direct a beam of light in parallel rays towards all of the zones of said group, and an optical device disposed between said lens system and said filter, said device having a free space through which part of said beam may pass substantially undeviated to all of the zones of said group and also having a set of reflectors comprising pairs of parallel reflecting surfaces at 45° to the plane of the filter and arranged to intercept another part of said beam and to divert it through paths parallel to the axis of said beam but offset laterally of said zones with respect to the original paths of the intercepted light, said filter comprising a zone adjacent to said group but of different color than the next adjacent zone of the group and through which some of said intercepted part of the light beam is diverted.

4. In an apparatus for taking color pictures upon a lenticulated film, a plural-zoned color filter in front of said film and comprising a group of adjacent zones the sum of whose colors gives substantially the effect of white light, a collimating lens system in front of said filter and having a diameter at least as great as the width of said group, whereby it may direct a beam of light in parallel rays towards all of the zones of said group, and an optical device disposed between said lens system and said filter, said device having a free space through which part of said beam may pass substantially undeviated to all of the zones of said group and also having a set of reflectors comprising pairs of parallel reflecting surfaces at 45° to the plane of the filter and arranged to intercept another part of said beam and to divert it through paths parallel to the axis of said beam but offset laterally of said zones with respect to the original paths of the intercepted light to the extent of the width of one filter zone, said filter comprising a zone adjacent to said group but of different color than the next adjacent zone of the group and through which some of said intercepted part of the light beam is diverted.

5. In an apparatus for taking color pictures upon a lenticulated film, a plural-zoned color filter in front of said film and comprising a group of adjacent zones the sum of whose colors gives substantially the effect of white light, a collimating lens system in front of said filter and having a diameter at least as great as the width of said group, whereby it may direct a beam of light in parallel rays towards all of the zones of said group, and an optical device disposed between said lens system and said filter, said device having a free space through which part of said beam may pass substantially undeviated to all of the zones of said group and also having sets of reflectors each comprising pairs of parallel reflecting surfaces at 45° to the plane of the filter and arranged to intercept other parts of said beam and to divert them through paths parallel to the axis of the beam but offset in directions opposite to each other laterally of said zones with respect to the original paths of the intercepted light.

6. In an apparatus for taking color pictures upon a lenticulated film, a plural-zoned color filter in front of said film and comprising a group of adjacent zones the sum of whose colors gives substantially the effect of white light, a collimating lens system in front of said filter and having a diameter at least as great as the width of said group, whereby it may direct a beam of light in parallel rays towards all of the zones of said group, and an optical device disposed between said lens system and said filter, said device having a free space through which part of said beam may pass substantially undeviated to all of the zones of said group and also having sets of reflectors each comprising pairs of parallel reflecting surfaces at 45° to the plane of the filter and arranged to intercept other parts of said beam and to divert them through paths parallel to the axis of the beam but offset in directions opposite to each other laterally of said zones with respect to the original paths of the intercepted light, each of said parts being offset to the extent of the width of one filter zone.

7. In an apparatus for taking color pictures upon a lenticulated film, a plural-zoned color filter in front of said film and comprising a group of adjacent zones the sum of whose colors gives substantially the effect of white light, a collimating lens system in front of said filter and having a diameter at least as great as the width of said group, whereby it may direct a beam of light in parallel rays towards all of the zones of said group, and an optical device disposed between said lens system and said filter, said device having a free space through which part of said beam may pass substantially undeviated to all of the zones of said group and also having sets of reflectors each comprising pairs of parallel reflecting surfaces at 45° to the plane of the filter and arranged to intercept other parts of said beam and to divert them through paths parallel to the axis of the beam but offset in directions opposite to each other laterally of said zones with respect to the original paths of the intercepted light, each of said parts being offset to the extent of the width of one filter zone and said filter comprising additional zones adjacent to said group on opposite sides' thereof but of different color than the zones of the group respectively adjacent thereto, where said diverted parts may pass through said additional zones.

EDGAR GRETENER.

CERTIFICATE OF CORRECTION.

Patent No. 2,201,487.        May 21, 1940.

EDGAR GRETENER.

It is hereby certified that error appears in the printed specification of the above numbered patent requiring correction as follows: Page 4, second column, line 23, claim 7, for the word "where" read --whereby--; and that the said Letters Patent should be read with this correction therein that the same may conform to the record of the case in the Patent Office.

Signed and sealed this 25th day of June, A. D. 1940.

(Seal)

Henry Van Arsdale,
Acting Commissioner of Patents.

CERTIFICATE OF CORRECTION.

Patent No. 2,201,487.   May 21, 1940.

EDGAR GRETENER.

It is hereby certified that error appears in the printed specification of the above numbered patent requiring correction as follows: Page 4, second column, line 23, claim 7, for the word "where" read --whereby--; and that the said Letters Patent should be read with this correction therein that the same may conform to the record of the case in the Patent Office.

Signed and sealed this 25th day of June, A. D. 1940.

(Seal)

Henry Van Arsdale,
Acting Commissioner of Patents.